(12) United States Patent
Alkalai et al.

(10) Patent No.: US 7,020,076 B1
(45) Date of Patent: Mar. 28, 2006

(54) FAULT-TOLERANT COMMUNICATION CHANNEL STRUCTURES

(75) Inventors: Leon Alkalai, Studio City, CA (US); Savio N. Chau, Hacienda Heights, CA (US); Ann T. Tai, Los Angeles, CA (US)

(73) Assignee: California Institute of Technology, Pasadena, CA (US)

( * ) Notice: Subject to any disclaimer, the term of this patent is extended or adjusted under 35 U.S.C. 154(b) by 717 days.

(21) Appl. No.: 09/698,514

(22) Filed: Oct. 26, 2000

Related U.S. Application Data

(60) Provisional application No. 60/161,697, filed on Oct. 26, 1999.

(51) Int. Cl.
*H04L 1/22* (2006.01)

(52) U.S. Cl. .................. 370/217; 370/225; 714/43
(58) Field of Classification Search ........ 370/216–217, 370/220–228; 714/43; 710/100, 305
See application file for complete search history.

(56) References Cited

U.S. PATENT DOCUMENTS

| | | | | |
|---|---|---|---|---|
| 5,444,860 A | * | 8/1995 | Datwyler et al. | 710/52 |
| 5,576,702 A | * | 11/1996 | Samoylenko | 340/825.5 |
| 5,603,044 A | * | 2/1997 | Annapareddy et al. | 710/301 |
| 5,742,753 A | * | 4/1998 | Nordsieck et al. | 714/11 |
| 5,784,547 A | * | 7/1998 | Dittmar et al. | 714/4 |
| 5,914,957 A | * | 6/1999 | Dean et al. | 370/438 |
| 5,946,321 A | * | 8/1999 | Dean | 370/451 |
| 6,011,781 A | * | 1/2000 | Bell | 370/254 |
| 6,151,298 A | * | 11/2000 | Bernhardsson et al. | 370/225 |
| 6,308,282 B1 | * | 10/2001 | Huang et al. | 714/4 |
| 6,600,723 B1 | * | 7/2003 | Reeb et al. | 370/245 |
| 6,647,446 B1 | * | 11/2003 | James et al. | 710/100 |

* cited by examiner

*Primary Examiner*—Hassan Kizou
*Assistant Examiner*—Gregory Sefcheck
(74) *Attorney, Agent, or Firm*—Fish & Richardson P.C.

(57) ABSTRACT

Systems and techniques for implementing fault-tolerant communication channels and features in communication systems. Selected commercial-off-the-shelf devices can be integrated in such systems to reduce the cost.

7 Claims, 11 Drawing Sheets

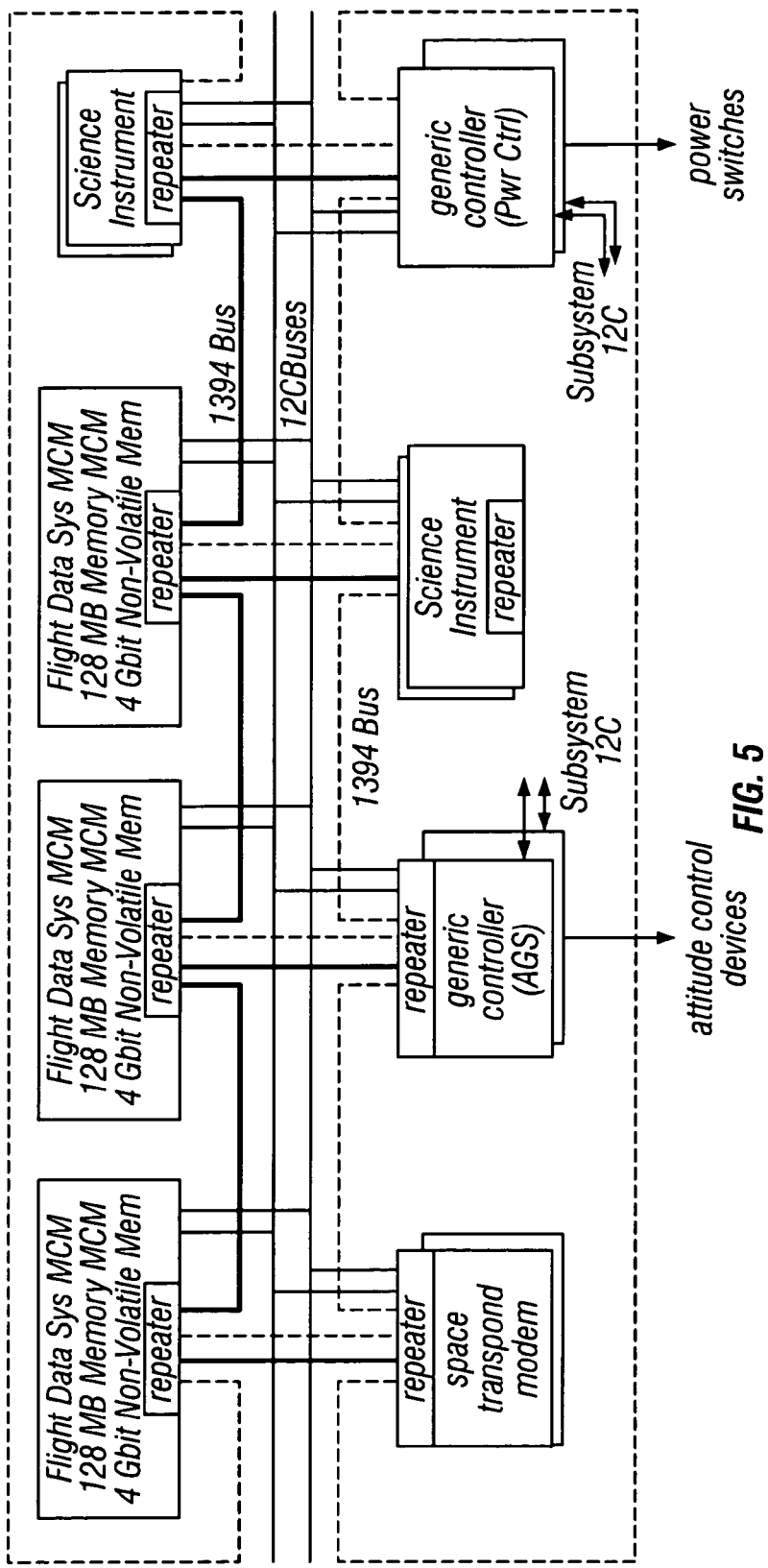
FIG. 5
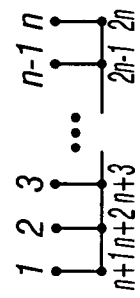
FIG. 6A
FIG. 6B
FIG. 6C
FIG. 6D

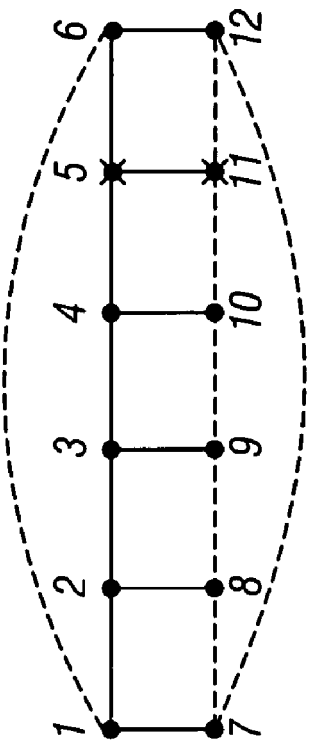
FIG. 9A
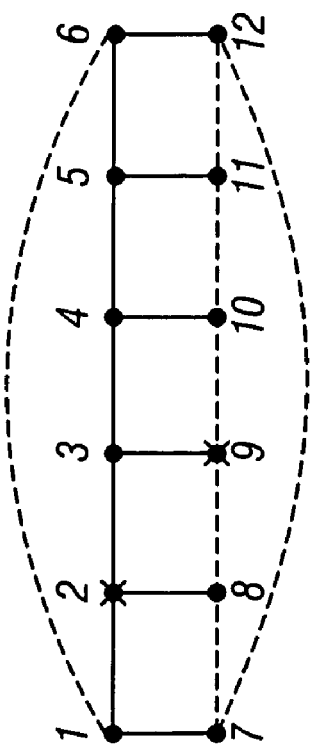
FIG. 9B
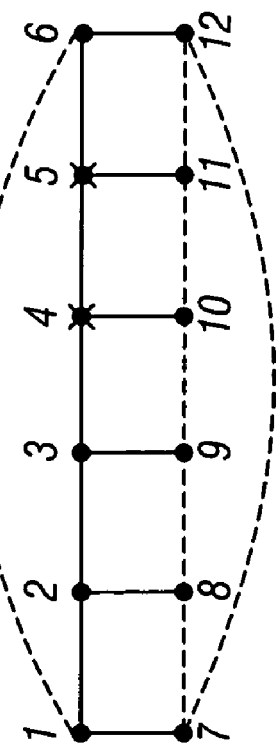
FIG. 9C
FIG. 9D

FAULT-TOLERANT COMMUNICATION CHANNEL STRUCTURES

This application claims the benefit of U.S. Provisional Application No. 60/161,697, filed Oct. 26, 1999.

ORIGIN OF THE INVENTION

The invention described herein was made in the performance of work under a NASA contract, and is subject to the provisions of Public Law 96-517 (35 U.S.C. 202) in which the Contractor has elected to retain title.

BACKGROUND

This application relates to signal transmission and data communication techniques and systems, and more particularly, to fault-tolerant communication channel structures for information systems such as digital electronic systems and techniques for implementing the same.

Information systems generally include multiple information devices that are connected through various communication channels so that information can be transmitted from one device to another. Each device may be a receiver which only receives information from one or more other linked devices, a transmitter which only sends information to one or more other linked devices, or a transceiver which can operate as both a receiver and a transmitter. In the communication terminology, such an information system is essentially a communication network of communication nodes that are interconnected by hard-wired or wireless communication channels or links, where each node is an information device.

For example, such an information system or a communication network may be a general-purpose digital computer system which may include one or more computer processors, certain memory units, and various other devices. The communication channels in such a system often include electronic buses each of which has a collection of conducting wires for transmitting information in form of electronic signals. Other forms of communication channels may also be used, such as a wireless radio-frequency link or an optical communication channel which transmits information through one or more optical carriers over an optic fiber link or a free-space optical link. Another example of an information system is a task-specific computer system such as a flight control system for spacecraft or aircraft, which may integrate two or more computer systems, one or more navigation systems, and other devices together to perform complex computations.

One desirable feature of these systems is the system reliability against one or more faults or failures of nodes and communication channels in the network. One way to achieve such reliability is to make the system "fault-tolerant" so that the system can continue to operate, in the presence of faults, to meet the system specification without failure of the entire system. Such a fault in a node or a communication channel may be caused by software, hardware, or a combination of both.

One conventional fault-tolerant system duplicates all operations in a particular system. For example, each node may be duplicated and the duplicated nodes are used to perform the identical operations. Hence, in one implementation, when one node fails, one or more other duplicated nodes can take over. A voting scheme may also be used to produce the output of a node based on outputs of the corresponding duplicates.

Nodes in a communication system may be linked in a number of ways. In one classification, different linking configurations may be divided as one-connected-graph systems or two or multiple-connected-graph systems. In a one-connected-graph system such as a string of nodes in a line configuration or certain tree configurations, a communication between two nodes can fail due to a single failure in a communication link or node. Hence, a single-point failure in the network can partition the system and isolate one node or a group of nodes from the rest of the system. In a two-connected-graph system, at least two separate communication links or nodes must fail to break the communication between two nodes to cause a partition. A ring with multiple nodes is one example of a two-connected-graph system.

SUMMARY

The present disclosure includes systems and techniques for implementing fault-tolerant communication channels and features in communication systems. Selected commercial-off-the-shelf devices can be integrated in such systems to reduce the cost.

One embodiment of such a system includes a plurality of node devices, each operable to transmit or receive information, and a first set of composite communication links to connect the node devices to form a communication network. Each composite communication link has at least a first type communication channel and a second type, different communication channel. The communication channels of the first type are connected to the nodes to form a first network in a first topology. The communication channels of the second type are connected to the nodes to form a second network in a second, different topology. At least one of the first and the second networks is not partitioned when a failure occurs.

BRIEF DESCRIPTION OF DRAWINGS

FIG. 5 shows detailed connections of the system in FIG. 1.

FIGS. 6A through 6D show exemplary tree structures.

FIGS. 9A through 9F illustrate cut-type and non-cut-type failures.

DETAILED DESCRIPTION

The fault-tolerant systems and techniques of the present disclosure include one or more fault-tolerant features based on redundancy in the communication channels linking different nodes in one-connected-graph communication systems. Hence, duplication of nodes is not required in the present systems although such duplication may be combined with the redundancy in the communication channels. In certain applications, duplication of nodes may not be practical or feasible because duplicated nodes may increase the physical size, system complexity, power consumption, and cost of a fault-tolerant communication system. One example is a fault-tolerant avionic system for aircraft or spacecraft which demands compact system packaging, low power consumption, and light weight. The present fault-toleration features based on redundancy in the communication channels may be implemented without duplicating nodes to meet these and other application requirements.

The redundancy in the communication channels for one-connected-graph systems may be implemented at two different, separate levels. First, composite fault-tolerant links are constructed to each include at least two communication channels with different link topological configurations and are used to interconnect the nodes. Such a composite fault-tolerant link at the system level will be referred to as "a bus set" when all communication channels in the link are formed of buses with conducting wires. Hence, at least two independent, different link networks coexist to connect the same set of nodes in such a system and assist each other to increase the fault tolerance of the system. The communication channels in each composite fault-tolerant link are selected so that when a particular node or link fails, at least one of the link networks is not partitioned and can bypass that failed node or link to tolerate that particular failure. This provides a first level of redundancy.

Figure 1:
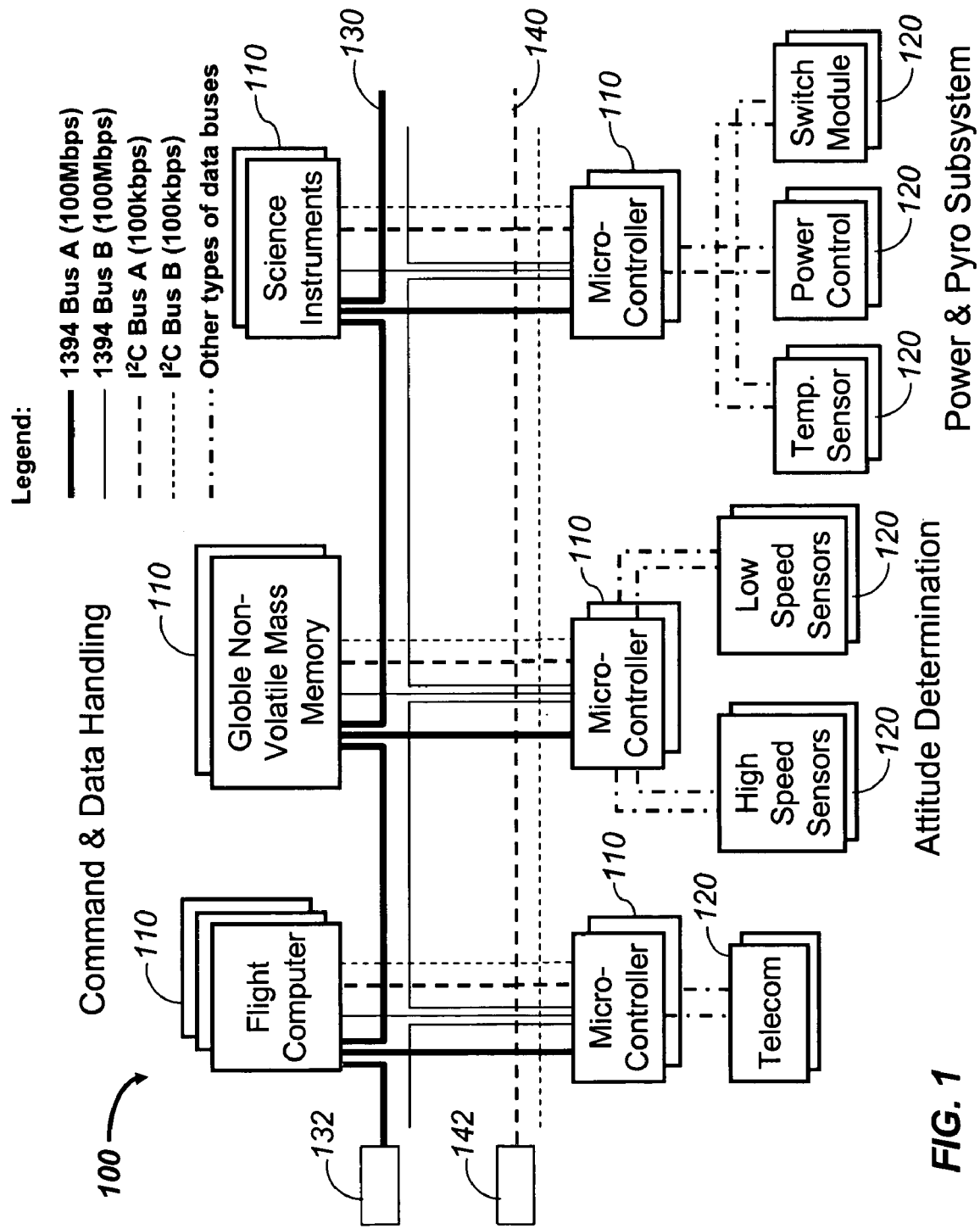
FIG. 1 shows one embodiment of an avionic system base don a fault-tolerant system of the present invention.

FIG. 1 shows one example of an avionic system 100 that implements the above composite fault-tolerant links. The devices in the system 100 include node devices 110 and non-node devices 120. At the system level, the node devices 110 are interconnected by the composite fault-tolerant buses, each of which includes an IEEE 1394 bus 130 and an I2C bus 140. The 1394 buses 130 are used to connect the node devices 110 in a one-connected tree topology. The I2C bus 140, however, connects the node devices 110 in a serial multi-drop topology. The non-node devices 120 may be connected to a node device 110 via suitable subsystem buses such as PCI, I2C, USB, and others. Two bus controllers 132 and 142 are respectively coupled to the buses 130 and 140 to control the bus operations. Control software routines may be loaded in the controllers 132 and 142.

In another level of redundancy in the communication channels, each composite fault-tolerant link in the system may be duplicated so that any two immediately-linked nodes are connected by at least a primary composite fault-tolerant link and a secondary composite fault-tolerant link. In operation, when the primary composite fault-tolerant link fails, the secondary composite fault-tolerant link is used by communicating through one of its two or more communication channels. Hence, this duplication of composite links provides at least four independent link networks with two different topological configurations to link the same set of nodes to improve the fault tolerance of the entire system.

In addition, the secondary composite fault-tolerant links may not be an exact copy of the primary composite fault-tolerant links. Instead, one set of communication channels for one particular topology in the primary composite fault-tolerant link connect the nodes differently from the duplicated set of communication channels for the same particular topology in the secondary composite fault-tolerant link. This is another layer of redundancy and can further improve the fault tolerance.

Assume, for example, one set of communication channels in the primary link may be in an one-connected tree topology and accordingly, the duplicated set of communication channels in the secondary composite link also form a tree topology. However, the set of channels and the duplicate set of channels connected the nodes differently so that the tree position of a particular node in the tree formed in the set of channels in the primary composite link is different from the tree position of that same node in the tree formed in the duplicated set of channels in the secondary composite link.

In particular, according to one embodiment, any node may not be a branch node in both trees in the primary and secondary composite links. Instead, a branch node in the tree formed in the primary composite link may be a leaf node in another tree formed in the secondary composite link. A leaf node in one tree, however, may be either a branch node or a leaf node in another tree. Hence, a failed node can only partition the tree in which it is connected as a branch node to which other nodes are connected. Because this same node is a leaf node in the other tree formed by another composite link, the failure of the node only causes the loss of a leaf node and will not affect other nodes and the tree structure.

Figure 2:
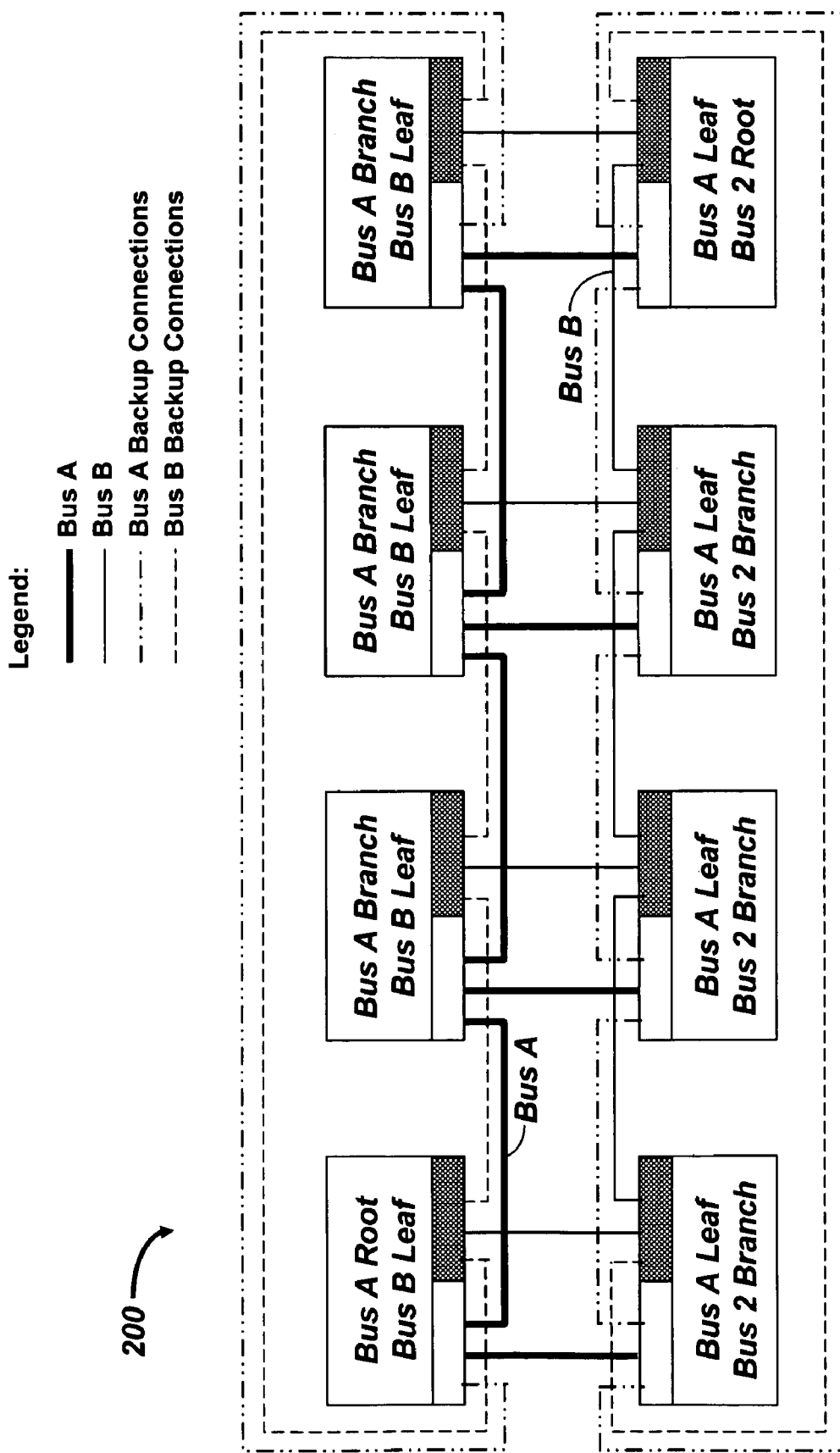
FIG. 2 shows an example of different tree connections in a composite fault-tolerant link and its duplicate.

FIG. 2 illustrates one exemplary implementation 200 of the above design choice, in which buses 1 and 2 are respectively the primary and secondary composite fault-tolerant links. Only the bus A for the tree in the bus 1 and the duplicate bus B for another tree in the bus 2 are shown and another bus and its duplication in the buses 1 and 2 are omitted. The IEEE 1394 bus may be used to implement the buses A and B.

Another feature of the present systems and techniques is that commercial-off-the-shelf (COTS) products may be used to implement some or all of the communication channels for the composite fault-tolerant links. Use of COTS products may significantly reduce the manufacture and maintenance cost in both hardware and software because such products are widely available and supported by the commercial market. A COTS product, such as the IEEE 1394 and I2C buses, may be integrated in the present fault-tolerant systems without changing its OEM characteristics so that the benefits of the commercial availability, updates and support can be fully utilized. In addition to achieve fault tolerance through the above-described multi-level redundancy in configuring the communication channels, the fault tolerance may be further enhanced by using the native fault containment in each COTS product and adding special hardware or software fault-tolerant features. These and other aspects will be described with reference to examples in using IEEE 1394 and I2C buses to implement the system 100 shown in FIG. 1.

1. General Approach to Integrating COTS Buses

One use of the fault protection techniques is fault containment in devices used in the space exploration. Traditionally, a spacecraft is divided into fault containment regions. Rigorous design effort is used to ensure no effects of a fault within a containment region will propagate to the other regions. Single-fault tolerance have been implemented in various spacecraft designs based on dual redundancy of fault containment regions.

Integrating COTS products into such a single-fault tolerance system can face certain difficulties. One of the reasons is that COTS are not developed with the same level of rigorous fault tolerance in mind. Hence, there are many fundamental fault tolerance shortcomings in COTS. For examples, the commercial VersaModule Eurocard (VME) bus usually does not have the parity bit to check the data and address. Another example is the IEEE 1394 bus (cable implementation) adopts a tree topology in which a single node or link failure will partition the bus. These fundamental weakness can hinder rigorous enforcement of fault containment. In addition, it is usually difficult to modify COTS products in general. This is in part because the suppliers of COTS products generally have no interest to change their design, add any overhead, or sacrifice their performance for a narrow market of high reliability applications. Also, any modification may render the COTS incompatible with commercial test equipment or software, and therefore can significantly reduce the economic benefits of COTS. Therefore, fault tolerance cannot easily be achieved by a single layer of fault containment regions that contains COTS.

The COTS-based bus architecture of the system 100 shown in FIG. 1 uses a multi-level fault protection methodology to achieve high reliability. The levels of the methodology are described as follows:

Level 1: Native Fault Containment—most of COTS bus standards have some limited fault detection capabilities. These capabilities should be exploited as the first line of defense.

Level 2: Enhanced Fault Containment—addition layer of hardware or software can be used to enhance the fault detection, isolation, and recovery capabilities of the native fault containment region. Examples are watchdog timer or additional layer of error checking code. The added fault tolerance mechanisms should not affect the basic COTS functions. This level is also a convenient level to implement provisions for fault injections.

Level 3: Fault Protection by Component Level Design-Diversity—certain COTS suffer fundamental fault tolerance weakness that may not be simply removed by enhancing the native fault protection mechanisms. Such weakness is generally related to single points of failures. One example of applying design diversity is the protection of the tree topology of the IEEE 1394 bus. Once the IEEE 1394 bus is partitioned by a failed node, no watchdog timer or extra layer of protocol can reconnect the bus. Similar examples include buses using other point-to-point topologies. In order to compensate for such fundamental shortcomings, complementary types of buses may be used to implement this level of fault protection. In particular, the I2C bus, which has a multi-drop bus topology, is used in the architecture of the system 100 to complement the IEEE 1394 fault isolation and recovery.

Another example of design-diversity to compensate for COTS reliability is the use of flash memory for the Non-Volatile Memory in the system 100 in FIG. 1. The flash memory can provide adequate storage density but it has been observed that a single high energy particle can corrupt an entire block in the flash memory. To handle such failure mode with error correcting codes alone may not meet the reliability requirement. Therefore, in order to compensate for this weakness, a more robust but much lower density Giant Magnetoresistive RAM (GMRAM) or Ferroelectric RAM (FeRAM) may be used to store critical state data instead of the flash memory.

Level 4: Fault Protection by System Level Redundancy—the Level 3 fault containment regions will be replicated for system level fault containment. The redundant fault containment regions can be either in ready or dormant states, depending on the recovery time and other system requirements. If they are in ready state, voting or comparison of outputs among the regions will provide one more level of fault detection. In either case, the redundant regions are necessary resources for the fault recovery process.

2. Overview of the Avionics Architecture in FIG. 1

The avionics architecture 100 in FIG. 1 includes a number of compact PCI based "nodes" 110 connected by a composite fault-tolerant system bus. In this particular example, a "node" 110 can either be a flight computer, a global non-volatile mass memory, a subsystem microcontroller, or a science instrument. The fault-tolerant system bus is comprised of two COTS buses, the IEEE 1394 (130) and I2C (140). Both buses 130 and 140 are multi-master and therefore support symmetric scalable and distributed architectures. Due to the standard electrical interface and protocol of the COTS buses, nodes complying with the bus interfaces can be added to or removed from the system without impacting the architecture. The capability of each node can also be enhanced by adding circuit boards to the compact PCI bus. Some spacecraft functions that are handled by the avionics architecture 100 include: power management and distribution, autonomous operations for on-board planning, scheduling, autonomous navigation fault-protection, isolation and recovery, etc., telemetry collection, management and downlink spacecraft navigation and control, science data storage and on-board science processing, and interfacing to numerous device drivers which include both "dumb" and "intelligent" device drivers.

The current commercial IEEE 1394 bus 130 is capable to transfer data at 100, 200, or 400 Mbps. The IEEE 1394 bus has two implementations, cable and backplane. The cable implementation has adopted a tree topology and the backplane implementation has a multi-drop bus topology. The backplane 1394 bus is in general not widely supported in the commercial industry and thus will not be able to take the full advantage of COTS. The cable implementation has received wide commercial support and has better performance than the backplane implementation. Therefore, the cable implementation has been selected for the system 100 in FIG. 1.

The IEEE 1394 bus has two modes of data transactions, the isochronous transaction and the asynchronous transactions. The isochronous transaction guarantees on-time delivery but does not require acknowledgment, while the asynchronous transaction requires acknowledgment but does not guarantee on-time delivery. Isochronous messages are sent through "channels" and a node can talk on or listen to more than one isochronous channel. Each isochronous channel can request and will be allocated a portion of the bus bandwidth at the bus initialization. Once every 125 microseconds (called isochronous cycle), each isochronous channel has to arbitrate but is guaranteed a time slot to send out its isochronous messages. At the beginning of each isochronous cycle, the root sends out a cycle start message and then the isochronous transaction will follow. After the isochronous transaction is the asynchronous transaction. Asynchronous message is not guaranteed to be sent within an isochronous cycle. Therefore, a node may have to wait a number of isochronous cycles before its asynchronous message can be sent out. The asynchronous transaction employs a fair arbitration scheme, which allows each node to send an asynchronous message only once in each fair arbitration cycle. A fair arbitration cycle can span over many isochronous cycles, depending on how much of each cycle is used up by the isochronous transactions and how many nodes are arbitrating for asynchronous transactions. The end of a fair arbitration cycle is signified by an Arbitration Reset Gap.

During the bus startup or reset, the IEEE 1394 bus will go through an initialization process in which each node will get a node ID. In addition, the root (cycle master), bus manager, and isochronous resource manager will be elected. The root mainly is responsible for sending the cycle start message and acts as the central arbitrator for bus requests. The bus manager is responsible to acquire and maintain the bus topology. The isochronous resource manager is responsible for allocating bus bandwidth to isochronous nodes. The root, bus manager, and isochronous resource manger are not pre-determined, so that any nodes can be elected to take these roles as long as they have the capability.

The I2C bus is a simple bus with a data rate of 100 kbps. It has a more traditional multi-drop topology. The I2C bus has two open-collector signal lines: a data line (SDA) and a clock line (SCL) (not shown). Both signal lines are normally pulled high. When a bus transaction begins, the SDA line is pulled down before the SCL line. This constitutes a start condition. Then the address bits will follow, which is followed by a read/write bit and then an acknowledgment bit. The target node can acknowledge the receipt of the data by holding down the acknowledgment bit. After that, eight bits of data can be sent followed by another acknowledgment bit. Data can be sent repeatedly until a stop condition occurs, in which the source node signals the end of transaction by a low-to-high transition on the SDA line while holding the SCL line high.

The I2C uses collision avoidance to resolve conflicts between master nodes contending for the bus. If two or more masters try to send data to the bus, the node producing a 'one' bit will lose arbitration to the node producing a 'zero' bit. The clock signals during arbitration are a synchronized combination of the clocks generated by the masters using the wired-AND connection to the SCL line.

There are two applications of the I2C bus in this architecture. In the system level, it is used to assist the IEEE 1394 bus to isolate and recover from faults. In the subsystem level, a separate I2C bus may be used to collect engineering data from sensors and send commands to power switches or other equipment.

The system 100 in FIG. 1 as shown has three basic types of nodes: flight computer, microcontroller node, and non-volatile memory node. The flight computer node includes a high-performance processor module (250 MIPS); 128 Mbytes of local (DRAM) memory; 128 Mbytes of non-volatile storage for boot-up software and other spacecraft state data; an I/O module for interfacing with the IEEE 1394 and I2C buses. All modules can communicate with each other via a 33 MHz PCI bus. The microcontroller node is similar to the flight computer node except the microcontroller has lower performance and less memory to conserve power. It is used to interface sensors and instruments with the IEEE 1394 and I2C bus. The non-volatile memory node has four slices, each slice contains 256 Mbytes of flash memory and 1 Mbytes of GMRAM. The flash memory has much higher density and is suitable for block data storage. However, it has limited number of write cycles and is susceptible to radiation effects. The GMRAM has unlimited write cycles and is radiation tolerant, but its density is much lower than flash. The flash memory is used for software codes and science data storage while the GMRAM is used to store spacecraft state data. The non-volatile memory slices are controlled by a microcontroller with an IEEE 1394 and I2C bus interfaces.

3. Design of Composite Fault-Tolerant Link with COTS Buses

The composite fault-tolerant link in the system 100 of FIG. 1 includes two different buses, the IEEE 1394 bus (130) and the I2C bus (140). This choice for the system 100 is a result from evaluating a variety of commercial buses, including IEEE 1394, Fiber Channel, Universal Serial Bus (USB), Fast Ethernet, Serial Fiber Optic Data Bus (SFODB), ATM, Myrinet, FDD1, AS1773, and SPI. The IEEE 1394 bus is selected because of its high data rate (100, 200 or 400 Mbps), multi-master capability, moderate power consumption, strong commercial support, relatively deterministic latency, and the availability of commercial ASIC cores (referred to as Intellectual Properties or IPs in industry). The advantages of IPs are that they are reusable and can be integrated in ASICs and fabricated by rad-hard foundry to meet radiation requirements. The I2C bus is selected because of its low power consumption, multi-master capability, availability of ASIC IPs, adequate data rate (100 kbps) for low speed data, simple protocol, and strong commercial support. APL has even developed a rad-hard I2C based sensor interface chip.

Although the IEEE 1394 and I2C buses are very attractive in many aspects, it is recognized that they may not be ideal buses in the classical fault tolerance sense. The 1394 bus has limited fault detection features, and has no explicit fault recovery mechanisms such as built-in redundancy or cross strapping. In particular, the 1394 bus has a tree topology that can easily be partitioned by a single node or link failure. The I2C bus has almost no built-in fault detection except an acknowledgement bit after every byte transfer. However, they are preferred for this particular application in the system 100 in FIG. 1 over the other fault-tolerant buses mainly because of their low cost and commercial support.

The fault-tolerant features in the system 100 of FIG. 1 are designed in part to mitigate some common or critical failure modes for data buses in spacecraft avionics systems. However, such features may also be in other failure-tolerant systems and may require some modifications. NASA/JPL performs failure mode effect and criticality analysis for every spacecraft design. Based on those experiences, the following failure modes for data buses in avionics systems have been identified as either frequently occur or critical to the survival of the spacecraft:

(1). Invalid Messages: Messages sent across the bus contain invalid data.

(2). Non-Responsive: An expected response to a message does not return in time.

(3). Babbling: Communication among nodes is blocked or interrupted by uncontrolled data stream.

(4). Conflict of Node Address: More than one node has the same identification.

Figure 3:
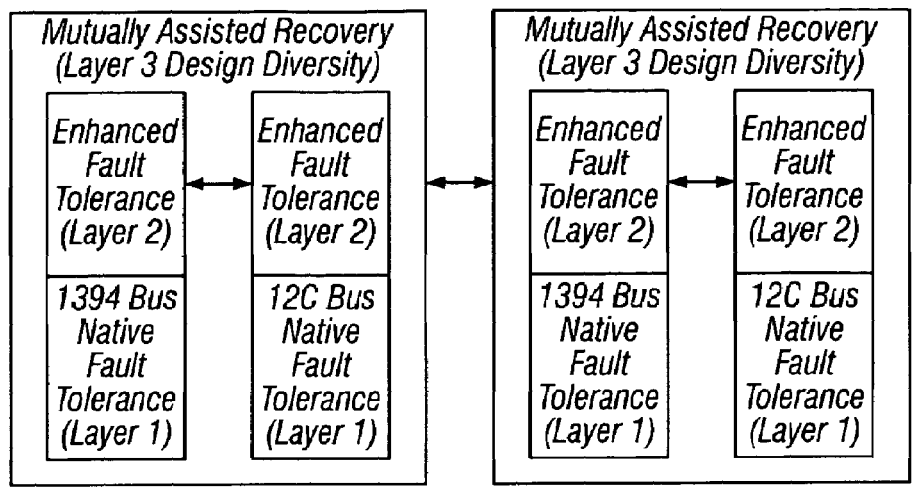
FIG. 3 shows one embodiment of the commercial-off-the-shelf bus architecture fault-tolerance strategy based on a multi-level approach.

FIG. 3 shows one embodiment of the COTS bus architecture fault-tolerance strategy based on the multi-level approach outlined above. This strategy first utilizes the native fault tolerance features of the IEEE 1394 and I2C buses to detect occurrence of faults. An additional layer of fault tolerance hardware and software enhances the fault detection and recovery capability of each bus. For difficult faults, the IEEE 1394 and I2C buses assist each other to isolate and recover from the faults. The entire set of IEEE 1394 and I2C buses are duplicated at the system level to provide necessary redundancy for fault recovery.

When a fault is detected in the primary bus set, simple recovery procedures such as retry and bus reset may first be attempted. If the simple procedures cannot correct the problem, then the backup set of buses may be activated and the system operations will be transferred to the backup bus. At this point, the system can have more time to diagnose the failed bus set and remove the faulty node or connections. The repaired bus set can then become the backup. The implementation of this bus architecture also allows the IEEE 1394 and I2C buses to be switched to their backups independently to enhance recovery flexibility. Details of each layer in FIG. 3 are explained as follows.

Layer 1: Native Fault Containment—The basic fault detection mechanisms of the IEEE 1394 and I2C buses such as CRC and acknowledgment are used to detect invalid messages or non-responsive failure modes.

Layer 2: Enhanced Fault Containment—A layer of hardware and software is used to detect more difficult failure modes such as babbling and conflict of node addresses in the IEEE 1394 and I2C buses. This layer may also include some low-level fault recovery mechanisms in each bus.

Layer 3: Fault Protection by Design Diversity—Since the IEEE 1394 bus adopts a tree topology, it can be difficult to isolate or recover from a failed node or link because the bus network is partitioned and communication between the sub-trees is cut off. The I2C bus is used to assist the fault isolation and recovery by maintaining the communication of all nodes. Similarly, if the shared medium of the I2C bus fails, the IEEE 1394 bus can be used to assist the fault isolation and recovery of the I2C bus.

Layer 4: Fault Protection by System Level Redundancy—The entire set of IEEE 1394 and I2C buses are duplicated to provide redundancy for fault recovery. For long-life missions, only one set of the buses will be activated in normal operations. If one of the buses in the primary bus set fails, the backup set of buses will be activated and the system operations will be transferred to the backup buses. After that, the failed bus set will be diagnosed and repaired. It is worth to notice that even though either one of the buses in the primary set can be switched to its backup bus independently, it is preferred to have the entire bus set switched. This is because the system operations in the backup bus set will not be affected while the healthy bus (e.g., I2C bus) in the failed bus set is diagnosing the faulty bus (e.g., IEEE 1394 bus).

3.1 Native fault containment regions

Certain basic fault detection mechanisms of the IEEE 1394 and I2C buses are highlighted in this section.

The 1394 bus standard has a number of built-in fault detection mechanisms, including:

A. Data and packet header CRCs for both isochronous and asynchronous transactions;

B. Acknowledgment packets include error code to indicate if the message has been successfully delivered in asynchronous transactions;

C. Parity bit to protect acknowledgment packets;

D. Response Packets include error code to indicate if the requested action has been completed successfully in asynchronous transactions; and E. Built-in timeout conditions: response timeout for split transaction, arbitration timeout, acknowledgment timeout etc.

A useful feature in the IEEE 1394a standard (Draft 2.0, March 1998) is the capability to enable or disable individual ports (a port is the physical interface to a link). With this feature, every node in the bus can disable a link connected to a failed node and enable a backup link to bypass the failed node. This feature is the basis of the IEEE 1394 bus recovery in this bus architecture.

Another feature in the IEEE 1394 standard is the keep-alive of the physical layer with cable power. This feature allows the link layer hardware and the host processor to be powered off without affecting the capability of the physical layer to pass on messages. This is useful for isolating a failed processor during fault recovery.

The I2C bus has only one fault detection mechanism which is the acknowledgment bit that follows every data byte. When a node (master) sends data to another node (slave), and if the slave node is able to receive the data, it has to acknowledge the transaction by pulling the data line (SDA) to low. If the slave node fails to acknowledge, the master node will issue a stop condition to abort the transaction. Similar situation can happen when the master node requests data from a slave node. If the master fails to acknowledge after receiving data from the slave, the slave will stop sending data. Subsequently, the master node can issue a stop condition to terminate the transaction if it is still functional.

3.2. Enhanced fault containment regions

Several mechanisms are added to enhance the fault detection and recovery capability of the IEEE 1394 bus.

A. Heartbeat and Polling

Heartbeat is effective for detecting root failure while polling can be used to detect individual node failures. Since the cycle master (root) of the IEEE 1394 bus always sends out an isochronous cycle start message every 125 microseconds on the average, the cycle start message can be used as the heartbeat. All other nodes on the bus monitor the interval between cycle start messages. If the root node fails, other nodes on the bus will detect missing cycle start and initiate fault isolation process (to be discussed in later sections). However, cycle start can only detect hardware level faults since it is automatically generated by the link layer. Therefore, a software heartbeat should be used to detect faults in the transaction or application layers.

Other failure modes can also be detected by this method. For example, multiple roots will generate more than one hardware heartbeat (i.e., cycle start) within an isochronous cycle. By comparing the actual heartbeat interval with a minimum expected heartbeat interval, the multiple heartbeats can be detected. More discussions about the multiple root detection can be found in the next two sections.

Furthermore, software heartbeat is effective in detecting babbling nodes. If the fault causing the node to babble is in software, it is possible that the hardware heartbeat may appear to be valid since the cycle start is automatically generated by the link layer hardware. On the other hand, the software fault is likely to affect the software heartbeat. Therefore, the software heartbeat is preferred over the hardware heartbeat in detecting babbling nodes.

In addition to heartbeat, the root node can also send polling messages periodically to individual nodes by asynchronous transaction. Since asynchronous transaction requires acknowledgment from the target node, a node failure can be detected by acknowledgment timeout.

B. Isochronous Acknowledgment:

Sometimes, acknowledgment is desirable for isochronous transactions, especially when the isochronous transaction requires on-time and reliable delivery. Therefore, a confirmation message type is added to the application layer, so that the target node can report any isochronous transaction errors to the source node. The confirmation message itself can be either an isochronous or asynchronous transaction, depending on the time criticality. Furthermore, the data field of the original isochronous message contains the source node ID, so the target node knows where to report the isochronous transaction errors. If the confirmation message contains an error code, the source node can retransmit the message in isochronous or asynchronous mode as appropriate.

C. Link Layer Fail-Silence

The root node of the IEEE 1394 bus periodically sends a "fail silence" message to all nodes; every node in the bus has a fail silence timer in the link layer to monitor this message. Upon receiving the message, each node will reset its fail silence timer. If one of the nodes babbles because of a link layer or application layer failure, the fail silence message will be blocked or corrupted. This will cause the fail silence timer in each node to time out. Subsequently, the fail silence timer will disable the hardware of its own link layer and thus inhibit the node from transmitting or receiving messages (note: the ability of the physical layer to pass on message is unaffected). Eventually, after a waiting period, the link layers of all nodes including the babbling node will be disabled and the bus will become quiet again. At this time, another timer in the root will "unmute" the root itself and send a Link-on packet, which is a physical layer packet, to individual nodes. Upon receiving the Link-on packet, the physical layer of a node will send a signal to wake up its link layer. If a node causes the bus to fail again while its link layer is re-enabled, it will be identified as the failed node and will not be enabled again. If the root itself is the babbling node, other nodes will detect the unmute timeout and issue bus reset.

D. Watchdog Timers

The IEEE 1394 standard has specified many watchdog timers. Additional watchdog timers that are related to fault detection of the IEEE 1394 bus have been identified as follows.

E. CPU Watchdog Timer

A hardware timer to monitor the health of the host CPU (i.e., the microprocessor or microcontroller). This watchdog timer is an incremental counter and need to be reset by the CPU periodically. If the CPU fails to reset this watchdog, an overflow will occur which then will trigger a local reset.

F. Heartbeat Lost Timer

Triggered by lost of heartbeat (i.e., the Isochronous Cycle Start packet). This is one of the native fault detection mechanisms in the IEEE 1394 bus standard.

G. Poll Response Timer (in Root Node)

A software timer monitor the response time of polling message on the 1394 bus.

The enhanced fault-tolerance mechanisms for I2C bus include the protocol enhancement, the byte timeout, and the fail silence.

The protocol enhancement is a layer of protocol added to the I2C bus. This protocol includes a byte count after the address and two CRC bytes after the data. The system design for the system 100 in FIG. 1 also utilizes especial hardware messages commands to control critical functions. For these messages, command is sent followed by its complement to provide one more layer of protection.

The I2C bus permits a receiving node (slave or master) to hold down the clock signal (SCL) as a means to slow down the sending node (master or slave). This is to allow a fast node to send data to a slow node. However, it is possible that a failed receiving node causes a stuck-at-low fault on the SCL signal, so that the sending node may have to wait indefinitely. To recover from this failure mode, every node has a byte timeout timer to monitor the duration of the SCL signal. When the byte timeout timer in a node (including the faulty node) expires, it will disable the circuitry of the SDA and SCL transmitters. After all nodes have disabled their SDA and SDL transmitters, a recovery procedure similar to that in the fail-silence mechanism will be used to disable the failed node.

In the Fail Silence mechanism, one of the nodes in the I2C is designated as the controlling master. The controlling master periodically sends a "fail silence" message to all I2C nodes. All nodes will monitor this message with an I2C bus fail silence timer. Upon receiving the message, each node will reset its I2C bus fail silence timer. If one of the nodes is babbling so that the fail silence message is blocked or delayed, the I2C bus fail-silence timer of each node will time out. Subsequently, the bus transmitters of each node will be disabled to inhibit any transmission of messages. However, the bus receiver of each node is still enabled so that it can receive commands for fault recovery later on. After a waiting period, the bus transmitters of all nodes including the babbling node will be disabled and the bus will be quiet again. At this time, another timer in the controlling master node will "unmute" the node itself and send a message to re-enable the other nodes individually. If a node causes the bus to fail again while it is enabled, it will be identified as the failed node and will not be enabled again. If the root itself is the failed node, other backup nodes will detect the unmute timeout and promote themselves as the controlling master according to a pre-determined priority.

3.3. Fault Protection by Design Diversity

The combination of the IEEE 1394 and I2C buses can be used to isolate and recover from many faults that might not be possible if each bus is working alone. The failure modes that can be handled by the cooperation of the buses are described below.

A. Non-Responsive Failures:

In the IEEE 1394 bus, when a node or one of its links fails in the non-responsive mode, it will not be able to respond to requests and messages will not be able to pass through the node. The existence of the failure can easily be detected by the bus timeout, message re-transmission, heartbeat, or polling. In general, the failed node is relatively easy to isolate because all the nodes in the sub-tree under it will become non-responsive to the requests from the root node. Therefore, the prime suspect is usually the non-responsive node nearest to the root. However, to recover from the fault is not trivial because the tree topology of the bus has been partitioned in to two or three segments by the failed node. The nodes in each segment will not be able to communicate with the nodes in the other segments. Consequently, the root node will not be able to command the nodes in the other segments to change bus topology. It might be possible to devise distributed algorithms so that each node can try different link configurations to re-establish the connectivity. However, these algorithms usually are rather complicate and their effectiveness is difficult to prove.

Under these circumstances, the I2C bus can facilitate the communication among all the nodes. The root node will first interrogate the health of the nearest non-responsive node (i.e., the prime suspect) through the I2C bus. If the node does not respond or if its response over the I2C bus indicates any internal or physical connection failures, then the root node can send I2C messages to the other nodes and command them to reconfigure their links to bypass the failed node. If the prime suspect node is fault-free, then the root can repeat the interrogation (and recovery procedure) on the other nodes in separate segments.

Similarly, if a node in the I2C bus becomes non-responsive, the source node can interrogate the health of the target node through the IEEE 1394 bus, command the target node to reset its I2C bus interface, and request the target node to retransmit the message.

B. IEEE 1394 Bus Physical Layer Babbling

The fail-silence technique is effective to handle babbling failures in the I2C bus and in the link or application layers in the IEEE 1394 bus. However, the physical layer of the IEEE 1394 bus is rather complicate and contains state machines, it is possible that a transient fault would cause it to babble. A particular dangerous type of babbling is the continuous reset because any node in the IEEE 1394 bus is able to issue bus reset. Such failures cannot be handled by fail-silence. It is because if the physical layer is silenced, it will not be able to pass on messages and thus cause bus partitioning. In this case, each node can check its own physical layer (e.g., read the physical layer registers). If the physical layer is faulty, the processor of the node can issue a physical layer reset to correct the problem. However, if the physical layer fault is permanent, then the node has to inform the root node via the I2C bus. Subsequently, the root node can command other nodes via the I2C bus to reconfigure the bus topology to bypass the failed node.

C. Conflict of Node Addresses

The address of any node in the IEEE 1394 or I2C buses can be corrupted by permanent fault or single event upset. If the faulty address coincides with an existing node address, any read transaction to that address will be corrupted by bus conflict from the two nodes, and any write transaction will go to both nodes and may have unpredictable consequences. Hence, it is difficult to disable the fault node by the bus itself alone. However, with the redundant IEEE 1394/I2C bus set, this kind of failures can be handled through using one bus to disable a faulty node on the other bus, so that the erroneously duplicated node address can be eliminated.

3.4. Fault Protection by System Level Redundancy

The COTS bus set is duplicated to provide system level of fault protection. In addition, the duplicated bus set is not identically configured as its counter part. FIG. 2 illustrates one example that the IEEE 1394 bus in one bus set and the IEEE 1394 in its duplicate bus set connect the same node at different positions in their respective trees in a "stack-tree" topology.

Under catastrophic failure conditions such as bus power failure, both COTS bus sets may fail such that all communications among the nodes can be lost. To re-establish the communication, each node can execute a distributed recovery procedure that consists of a sequence of link enable/disable activities. The enabled links of all the nodes in each step of the procedure forms a bus configuration. If the critical nodes of the system can communicate with each other in one of the bus configurations, further fault recovery procedures can follow. Unfortunately, this approach usually requires reasonably tight synchronization among all the nodes, which is very difficult to achieve when all bus communications are lost. Furthermore, since the cause of the catastrophic failure may not be within the avionics system, the distributed recovery procedure may not succeed. Therefore, this approach may be used as the last recourse.

4. Detailed Examples Based on Stack-Tree Topology

Figure 4:
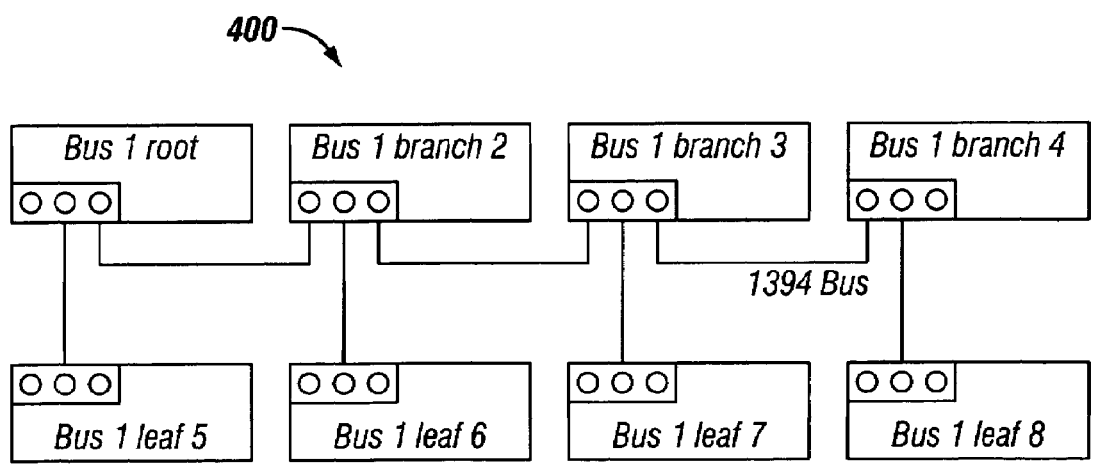
FIG. 4 shows an exemplary stack-tree bus topology.

The tree topology for the IEEE bus may be topologically simple so that it can be easily maintained as nodes are added to or deleted from the system for easy testing and integration. FIG. 4 shows one embodiment of a stack-tree topology 400, where a node is either a flight computer or a device. Three physical layer ports may be implemented in each node. For each branch node, two or more of these ports are connected to other nodes. A leaf node has only one port that is connected to another node. FIG. 5 shows more detailed node connections of the system 100 in FIG. 1 in such a stack-tree topology.

The stack-tree topology shown in FIG. 4 is not fault tolerant because any single node or link failure can result in tree partitioning such that fault-tolerant routing will not be possible. In addition, it can be difficult to duplicate and cross-strap nodes for bus network fault tolerance purpose due to the constraints on power and mass/volume in certain applications such as space flight missions. However, the IEEE 1394a standard provides a "port-disable" feature to allow a 1394-compliant, reconfigurable bus architecture which can be used for fault tolerance.

4.1. Stack-Tree based Bus Architecture

Definition 1 A stack tree is a tree where each branch node is connected to at most three other nodes among which at most two are branch nodes.

FIGS. 6(*a*)–6(*d*) show exemplary trees. FIGS. 6(*a*), 6(*c*) and 6(*d*) are stack trees while that in FIG. 6(*b*) is not because as the right node at the first level below the root is connected to three branch nodes, one of which is the root node.

Definition 2 A complete stack tree is a stack tree where each branch node is connected to at least one leaf node.

FIG. 6(*c*) depicts a complete stack tree (CST) with n branch nodes. This topology will be referred to as simplex complete stack tree (CSTs). Note that the nodes are labeled such that the branch nodes have the ID numbers from 1 to n, while the leaf nodes have the ID numbers from n+1 to 2n. This labeling scheme will be used in the remainder of the paper. Further, we use n, the number of branch nodes in a CST, to denote the size of the tree. Note also that the trees in FIGS. 6(*c*) and 6(*d*) are both $CST_S$. Based on the CST in FIG. 6(*c*), the CST mirror-image can be defined as follows.

Definition 3 The mirror-image of a complete stack tree is a tree obtained by (I) removing the edges connecting the branch nodes with the ID numbers i and j which satisfy the relation $|i-j|=1$; (2) adding edges to connect the leaf nodes with the ID numbers k and 1 which satisfy the relation $|k-1|=1$.

Clearly, the CST shown in FIG. 6(*d*) is a mirror image of that nodes in FIG. 6(*c*). It is worth to note that, if we connect 2n a CST-based network and its mirror image, then the two networks will not have any branch nodes in common.

It is desirable to make the system shown in FIG. 1 scalable and gracefully degradable. Accordingly, a fault-tolerant bus network architecture may be designed to allow all the surviving nodes in the bus network to remain connected in the presence of node failures, without requiring spare nodes. The fact that a CST and its mirror image do not have branch nodes in common implies that losing a branch node in one tree will not partition its mirror image.

Figure 7A:
FIGS. 7A through 7D show exemplary complete stack trees with dual bus designs.
Figure 7B:
Figure 7C:

FIG. 7A shows a dual bus scheme comprising a CST and its mirror image (denoted as CSTD). This scheme can be effective in tolerating single or multiple node failures given that I) the failed nodes are of the same type (all branch or all leaf) with respect to one of the complete stack trees (FIG. 7B), or 2) the failed nodes involve both branch and leaf nodes but they form a cluster at either end (or both ends) of a CST, which will not affect the connectivity of the remainder of the tree (FIG. 7C).

Figure 7D:

We use terminal clustered branch-leaf failures to refer to the second failure pattern. Thus, for the cases which involve only the above failure patterns, all the surviving nodes will remain connected (no network partitioning). On the other hand, if a branch node and a leaf node in a CSTD based network fail in a form other than terminal clustered branch-leaf failure (FIG. 7D), both the primary and mirror image will be partitioned.

Next, another tree structure with backup links is examined. The IEEE 1394 port-disable feature enables the physical connections between the physical layer of a node and the serial bus cable to become "invisible" from the view point of the reminder of the bus network. The implication is the following:

1) By using disabled ports, backup connections between nodes can be added without forming loops (recall that loops are prohibited by IEEE 1394), wherein a "backup connection" is defined as a serial bus cable that connects (via disabled ports) two nodes which are not expected to have a direct connection in the original network configuration (differing from connection replication); and 2) Upon fault detection, by disabling physical ports, a failed node will be allowed to be isolated from the rest of the bus network, and necessary backup link(s)can be activated (by enabling the corresponding ports) to repair the partitioned network such that messages can be routed in a reconfigured network, bypassing the failed node.

Figure 8A:
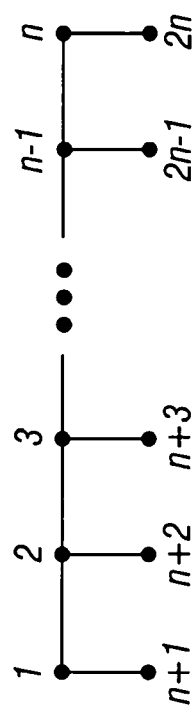
FIGS. 8A through 8C show one design of backup links.
Figure 8B:
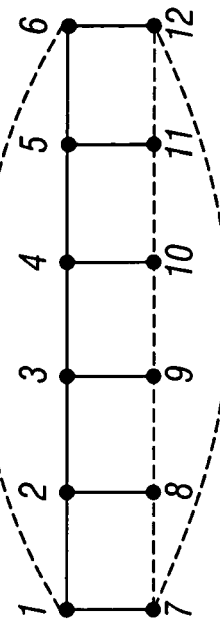

FIG. 8A shows a bus network based on the CSTs topology with n branch nodes (size n). If a backup link is added between any two leaf nodes labeled i and j which satisfy the relation |(i mod n)–(j mod n)|=1, and another backup link is added to connect branch nodes 1 and n, then a topology as shown in FIG. 8B is obtained (an instantiation of the topology with n=6). Because the added connections (dashed edges) are of inactive nature, the bus network remains free of loop and thus complies with the IEEE 1394 tree topology criterion.

Figure 8C:
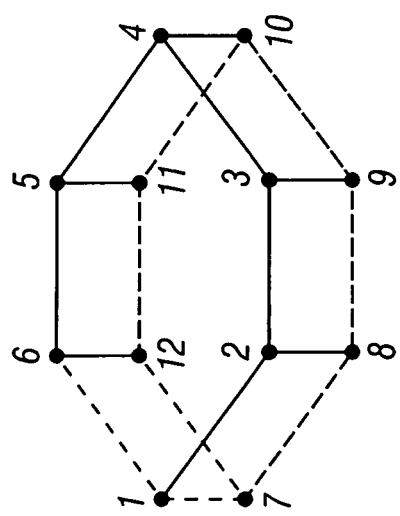

FIG. 8C illustrates the bus network from a 3-dimensional ring-like configuration. Accordingly, this bus network configuration is denoted as CSTR.

Definition 4 A failed branch node i and a failed leaf node j in a $CST_R$ a based network of size n will form a cut-type failure if |(j mod n)–(i mod n)|<1.

FIGS. 9A, 9B, 9C, and 9D illustrate the concepts of cut-type and non cut-type failures. Specifically, the failure comprised by nodes 2 and 9 in FIG. 9A, and that by nodes 5 and 11 in FIG. 9B are cut-type failures. On the other hand, the node failures shown in FIGS. 9C and 9D are non cut-type failures. Further, the term clustered failure will be used to refer to the failure of a group of nodes which are adjacent to each other.

Figure 9E:
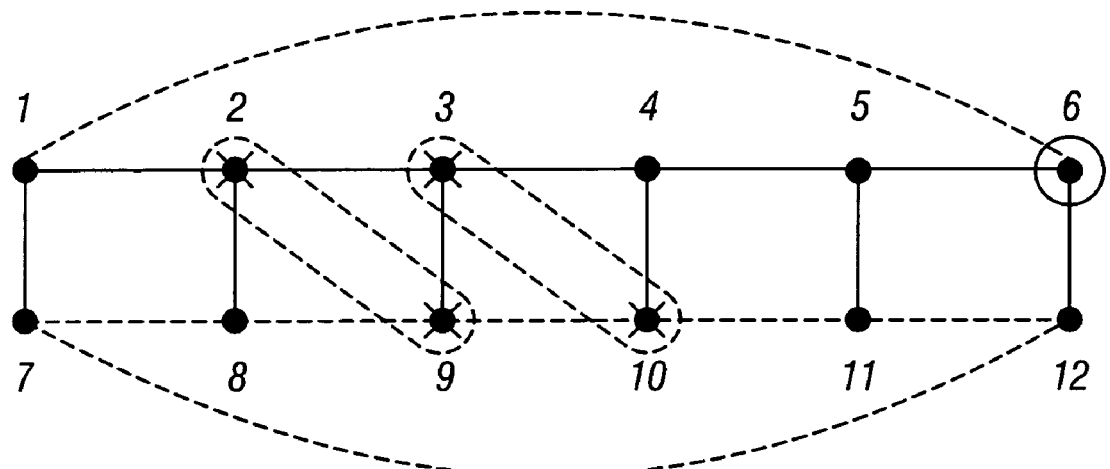
Figure 9F:
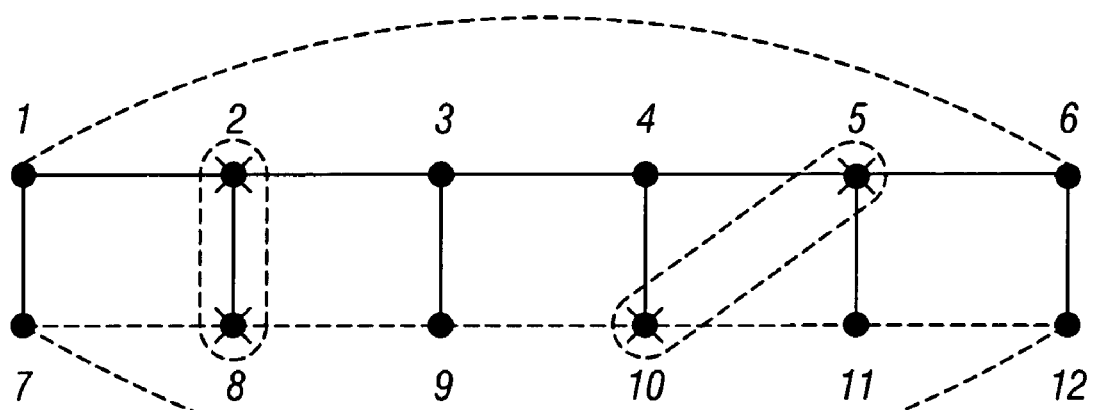

FIGS. 9E and 9F illustrate the scenarios of clustered and non-clustered multiple cut-type failures, respectively. Clearly, while the non-clustered cut-type failures shown in FIG. 9F leads to bus network partitioning (i.e., the traffic across either of the "cuts" are disabled), the clustered cut-type failures shown in FIG. 9E does not even if node 6 also fails (i.e., the traffic across the clustered "cuts" can be re-routed through the enabled backup links {1, 6} or {7,12}), although both scenarios involve multiple cut-type failures. The above discussion shows the necessary and sufficient condition for partitioning a $CST_R$ based bus network. Hence, a bus network based on the $CST_R$ topology will be partitioned if and only if there exist multiple cut-type failures which do not constitute a single cluster.

Figure 10A:
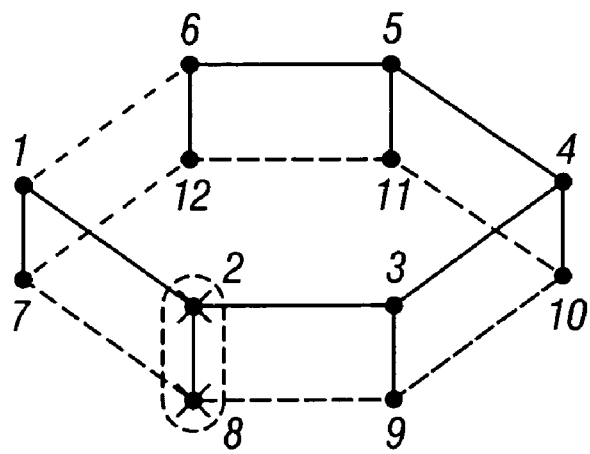
FIGS. 10A through 10C illustrate partitioning in a complete-stack-tree bus topology with backup links.
Figure 10B:
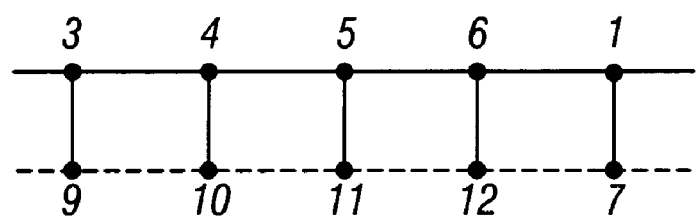
Figure 10C:
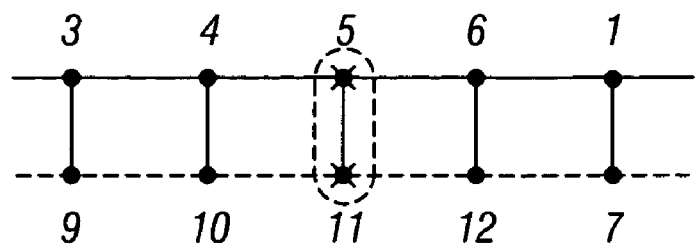

FIGS. 10A, 10B, and 10C illustrate partitioning in a network that originally has a $CST_R$ structure. FIG. 10A shows that the first cut-type failure (single or clustered) will break the ring structure so that the remainder of the network becomes a $CST_S$ based structure with backup links (FIG. 10B). The second cut-type failure (single or clustered) will break the $CST_s$ based structure, resulting in network partitioning as shown in FIG. 10C, in which the communication between any two nodes separated by the "cut" becomes impossible.

Figure 11:
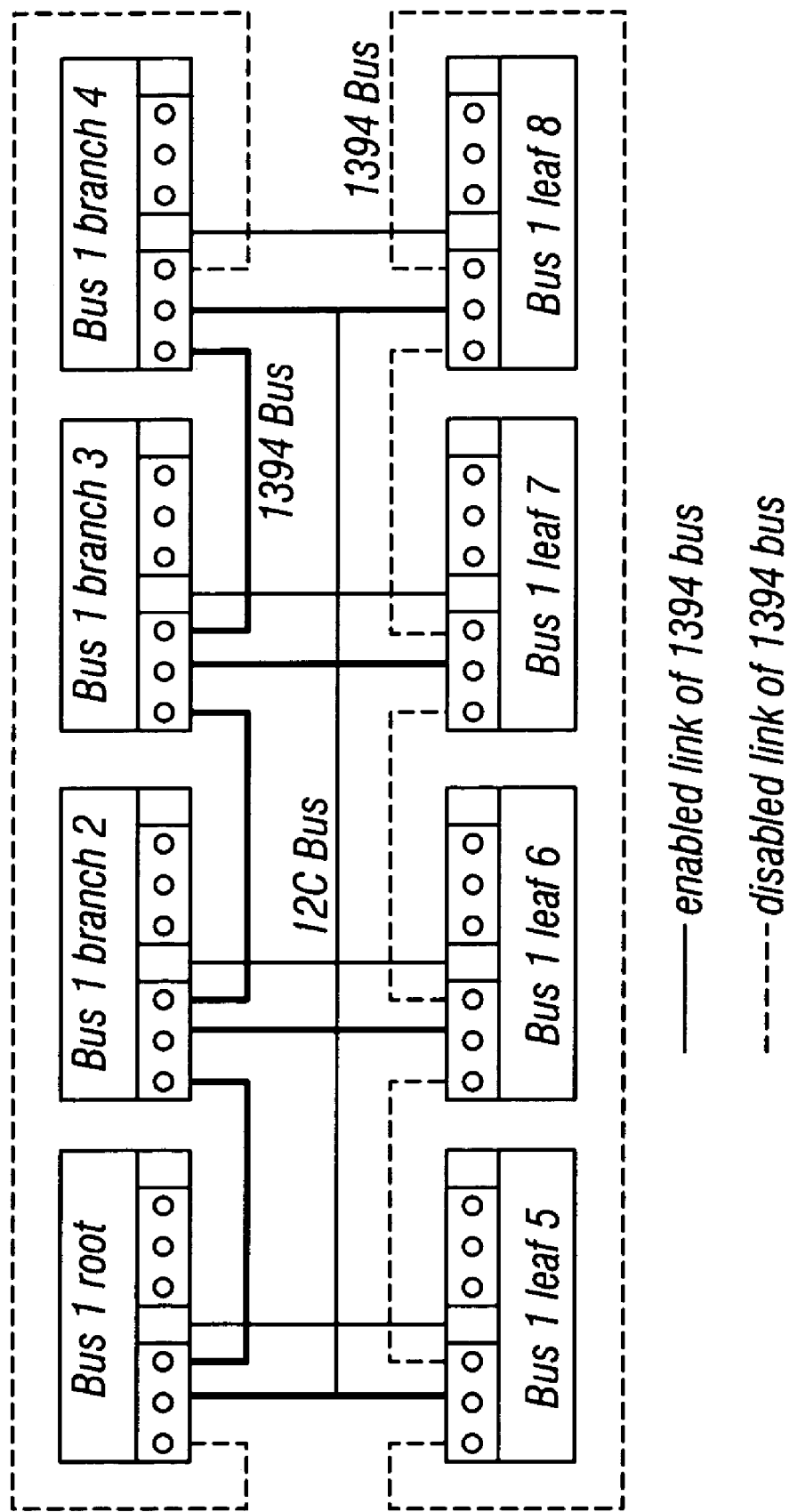
FIG. 11 shows one example of a fault-tolerant bus network.

FIG. 11 shows an example of the simplified fault-tolerant architecture in which the CSTR based bus network described above is implemented. The solid and dashed thick lines marked "1394 Bus" represent the active and backup links, respectively. During normal operation, the active connections are driven by enabled ports while the ports of backup connections are disabled to avoid loops. The thin lines marked "I2C Bus" correspond to the interface for fault detection, isolation and reconfiguration. The I2C bus is a very simple low-speed multi-drop bus and used only for protecting the 1394 bus. Hence this engineering bus has very low utilization and power consumption. For additional protection, a redundant bus (consisting of the 1394 and I2C buses) which is a mirror image of the configuration shown in FIG. 9 is proposed by our design [9J]. For clarity of illustration, the connections of the redundant bus are not shown in the figure.

4.2. Bus Network Reliability Evaluation

The bus network reliability can be defined as the probability that, through a mission duration t, the network remains in a state in which all the surviving nodes are connected. The causes of a node failure may include physical layer failure, link layer failure and CPU failure. Moreover, while redundant links (serial bus cables) are permitted in the present architecture, it is assumed herein that duplicated nodes and cross-strap nodes for bus network fault tolerance purpose are not allowed due to the power and mass/volume constraints. As a result, the likelihood of node failure is significantly greater than that of link failure.

Hence, under the above conditions, the following reliability assessment will focus on only node failure. It is also assumed that, when a node fails, there is a possibility that the faulty node may go undetected, or the corresponding network reconfiguration process (including port disabling/enabling, etc.) may unexpectedly crash the system. The complement of the probability of such an event is called "coverage."

Reliability models can be developed for the three complete stack tree structures discussed above. See, Tai et al., "COTS-Based Fault Tolerance in Deep Space: Qualitative and Quantitative Analyses of A Bus Network Architecture" in Proceedings of the 4th IEEE International Symposium on High Assurance Systems Engineering, Washington D.C., November 1999. The Reliability measures for the bus networks based on CSTs, CSTD and CSTR are evaluated with respect to the node failure rate $\lambda$, size of bus network n and mission duration t (in hours).

Figure 12:
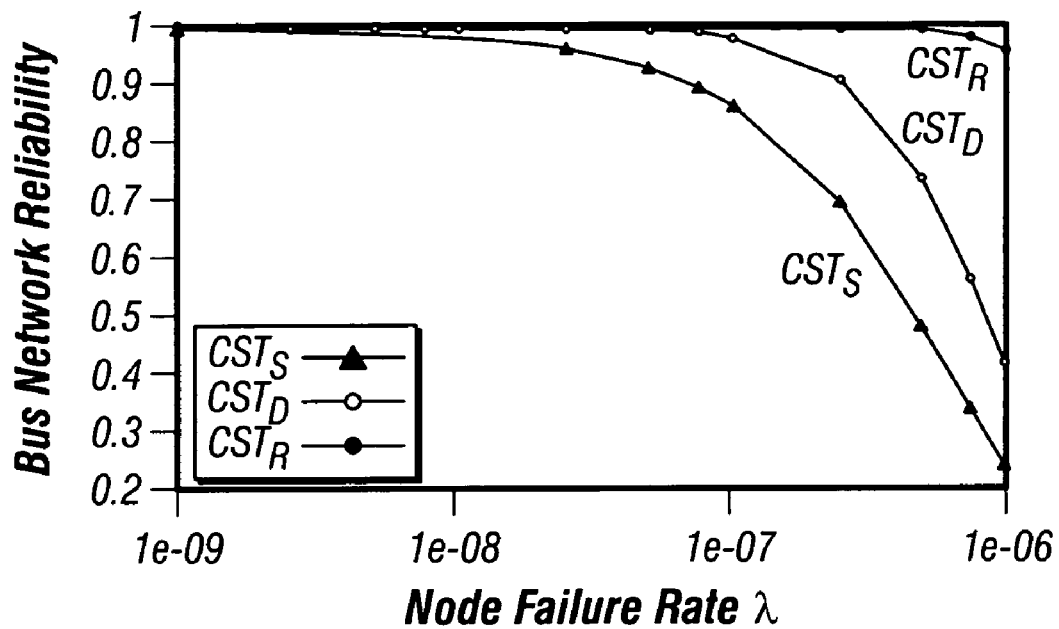
FIGS. 12, 13, and 14 show reliability results for three different bus networks.

FIG. 12 depicts the reliability of the three tree structures as functions of component node failure rate $\lambda$. In this evaluation, the size of the CST-based bus networks, n, is set to 16 (a 32-node network), the fault detection and reconfiguration coverage c is set to 0.9999 (which is conservative as the coverage is defined on a single node basis), and mission duration t is set to 90,000 hours (which implies an over 10-year long-life mission). It can be observed that, while CSTD results in an appreciable amount of improvement from CSTs, CSTR leads to significantly more reliability gain. The quantitative results show that REST will be greater than 0.999997 if node failure rate $10^{-8}$ or lower. On the other hand, when $\lambda$ is higher than $10^{-7}$, the reliability numbers for both CSTS and CSTD rapidly drop and become unacceptable but the reliability for CSTR remains relatively steady.

Figure 13:
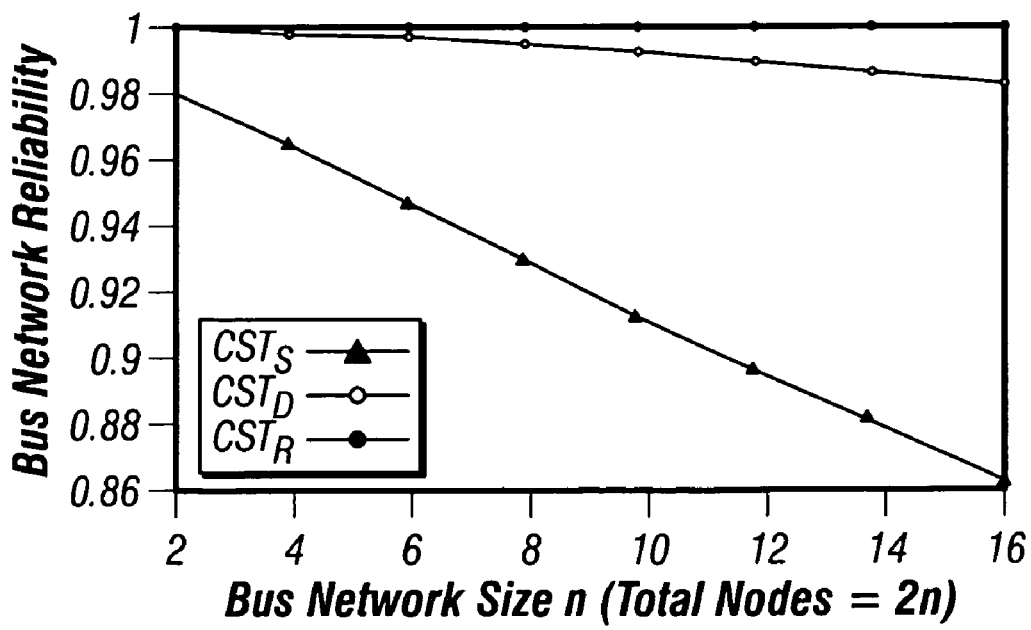

FIG. 13 shows the results of the evaluation for which $\lambda$ is set to $10^{-7}$, t and c remain 90,000 hours and 0.9999, respectively, while n becomes a variable parameter. It is interesting to note that the reliability for CSTD is equal to that for the CSTR when n=2. This is a reasonable result because for a 4-node network, the node failure patterns that will partition a CSTD-based network coincide with the failure patterns that will partition a CSTR-based network. It can also be observed that the reliability improvement by CSTR from CSTD becomes more significant as the size of the network increases. This is because more routing alternatives that are comprised by active and backup links are available in a larger CSTR based network.

Figure 14:
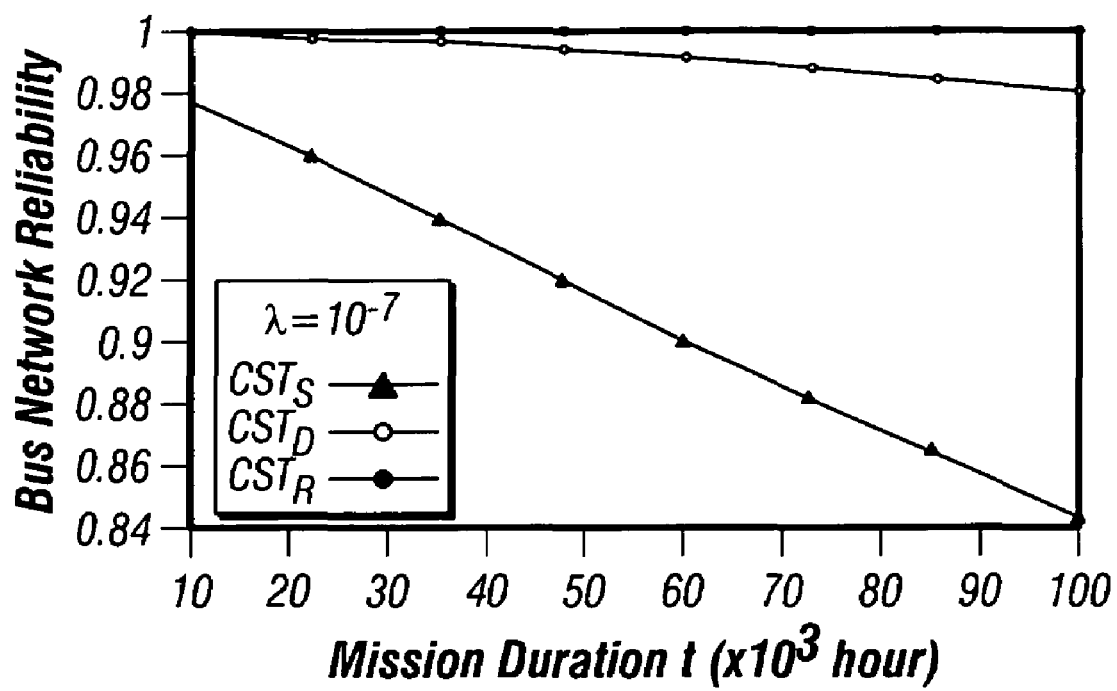

FIG. 14 illustrates the evaluation results of a study for which $\lambda$ and n are set to $10^{-7}$ and 16, respectively, and c remains 0.9999, while mission duration t becomes a variable parameter. Apparently, the reliability results for both CSTS and CSTD become unacceptable for long-life missions. On the other hand, the reliability for the CSTR remains reasonable at about 0.999929 even when t=100,000 (a mission duration about 1 I. 5 years).

The above disclosure only includes a few embodiments. However, it is understood that variations and enhancements may be made. For example, the examples are based on wired buses but various features may be implemented with other types of communication channels for data transmission, such as wireless links in either RF or optical frequencies or other wired links such as optical fiber links. All these and others are intended to be encompassed by the following claims.

The invention claimed is:

1. A system, comprising:
a plurality of node devices, each operable to transmit or receive information; and
a first set of composite communication links to connect said node devices to form a communication network, each composite communication link having at least a communication channel of a first type and a communication channel of a different, second type, communication channels of said first type connected to said nodes to form a first network in a first topology and communication channels of said second type connected to said nodes to form a second network in a second, different topology,
wherein at least one of said first and said second networks is not partitioned when a single node failure occurs
wherein a node having a node position in said first network has a different node position in said second network,
wherein each of said first and said second topologies is a tree topology, and wherein a branch node in said first network is not a branch node in said second network.

2. The system as in claim 1, wherein communication channels of said first type include IEEE 1394 buses.

3. The system as in claim 1, wherein communication channels of said second type include I2C buses.

4. A system, comprising:
a plurality of digital electronic node devices which include at least one computer;
a first set of buses of a first type to connect each and every of said node devices to form a first network with a first topology;
a second set of buses of a different, second type to connect each and every of said node devices to form a second network with a second topology which is different from said first topology,
wherein said first and said second topologies are selected to be complementary to each other so that a single-point failure causing a partition in one of said first and said second network does not cause a partition in another of said first and said second network,
wherein said first topology includes a tree topology and said second topology includes a multi-drop serial topology, wherein each node device has three ports designated for connections to other node devices in said tree topology,
wherein said tree topology includes n branch nodes in which each of a first branch node 1 and a nth branch node n is connected to only two other nodes, and each branch node in said tree topology is connected to (1) at most three other nodes among which at most two nodes are branch nodes and (2) at least one leaf node; and
a plurality of backup buses of said first type which are connected to selected nodes in said tree topology and are not activated in absence of a failure, wherein a backup link is connected between said branch nodes 1 and n and a backup link is connected between any two leaf nodes i and j which satisfy |(i mod n)−(j mod n)|=1.

5. A system, comprising:
a plurality of digital electronic node devices which include at least one computer;
a first set of buses of a first type to connect each and every of said node devices to form a first network with a first topology;
a second set of buses of a different, second type to connect each and every of said node devices to form a second network with a second topology which is different from said first topology, wherein said first and said second topologies are selected to be complementary to each other so that a single-point failure causing a partition in one of said first and said second network does not cause a partition in another of said first and said second network;
a third set of buses of said first type to connect each and every of said node devices to form a third network with a third topology; and
a fourth set of buses of said second type to connect each and every of said node devices to form a fourth network with a fourth topology which is different from said third topology,
wherein said third and fourth networks are operable to back up said first and said second networks, wherein each of said first and said third topologies is a tree topology, and where a branch node for one tree topology is not a branch node for another tree topology.

6. A method, comprising:
connecting node devices by a first set of communication links of a first type to form a first tree topology;
connecting said node devices by a second set of communication links of said first type to form a second tree topology, wherein a branch node in said first tree topology is not a branch node in said second tree topology;
connecting said node devices by a third set of communication links of a second type to form a first multi-drop serial topology;
connecting said node device by a fourth set of communication links of said second type to form a second multi-drop serial topology;
operating said first and said third sets of communication links to detect and bypass a failure location; and
operating said second and said fourth sets of communication links to back up said first and said third sets of communication links.

7. The method as in claim 6, wherein an IEEE 1394 bus is used for each communication link of said first type and an I2C bus is used for each communication link of said second type.

* * * * *